United States Patent
Backes

(10) Patent No.: US 11,199,440 B2
(45) Date of Patent: Dec. 14, 2021

(54) LENS PLATE, RAIN SENSOR, AND LIGHT SENSOR

(71) Applicant: BCS AUTOMOTIVE INTERFACE SOLUTIONS GMBH, Radolfzell (DE)

(72) Inventor: Ulrich Backes, Radolfzell (DE)

(73) Assignee: BCS AUTOMOTIVE INTERFACE SOLUTIONS GMBH, Radolfzell (DE)

( * ) Notice: Subject to any disclaimer, the term of this patent is extended or adjusted under 35 U.S.C. 154(b) by 0 days.

(21) Appl. No.: 16/647,547

(22) PCT Filed: Sep. 26, 2018

(86) PCT No.: PCT/EP2018/076140
§ 371 (c)(1),
(2) Date: Mar. 16, 2020

(87) PCT Pub. No.: WO2019/063622
PCT Pub. Date: Apr. 4, 2019

(65) Prior Publication Data
US 2020/0249081 A1    Aug. 6, 2020

(30) Foreign Application Priority Data
Sep. 27, 2017  (DE) .............. 10 2017 122 444.0

(51) Int. Cl.
*G01J 1/04* (2006.01)
*G01J 1/06* (2006.01)
(Continued)

(52) U.S. Cl.
CPC .............. *G01J 1/0411* (2013.01); *G01J 1/06* (2013.01); *G01J 1/4204* (2013.01); *G02B 3/08* (2013.01);
(Continued)

(58) Field of Classification Search
CPC .......... G01J 1/0411; G01J 1/0407; G01J 1/04; G01J 1/06; G01J 1/4204; G01J 1/42;
(Continued)

(56) References Cited

U.S. PATENT DOCUMENTS 5,661,303 A    8/1997  Teder
5,898,183 A *  4/1999  Teder .................... B60S 1/0837
                                                    250/574

(Continued)

FOREIGN PATENT DOCUMENTS

DE    10034555 A1    1/2002
DE    10261102 A1    7/2004
(Continued)

*Primary Examiner* — John R Lee
(74) *Attorney, Agent, or Firm* — McNees Wallace & Nurick LLC

(57) ABSTRACT

A lens plate (10) for a rain and/or light sensor is proposed. The lens plate (10) has a base body (18), at least one light limitation structure (21), and at least one lens structure (28), the light limitation structure (21) extending into the base body (18) from a lower side (14) of the lens plate (10), a contour (27) of the light limitation structure (21) facing away from the lower side (14) of the lens plate (10) limiting the lens structure (28) circumferentially, and the contour (27) being substantially triangular. Furthermore, a rain and/or light sensor (8) is proposed.

12 Claims, 2 Drawing Sheets

(51) Int. Cl.
*G01J 1/42* (2006.01)
*G02B 19/00* (2006.01)
*G02B 3/08* (2006.01)

(52) U.S. Cl.
CPC ..... *G02B 19/0009* (2013.01); *G02B 19/0076* (2013.01)

(58) Field of Classification Search
CPC ........ G02B 3/08; G02B 3/02; G02B 19/0009; G02B 19/0076; G02B 19/0038; G02B 19/0042; G02B 19/0033; G02B 27/09; G02B 27/0938; B60S 1/08; B60S 1/0833; B60S 1/0837
See application file for complete search history.

(56) References Cited

U.S. PATENT DOCUMENTS

| | | | |
|---|---|---|---|
| 7,751,054 B2 * | 7/2010 | Backes | B60S 1/0837 356/445 |
| 7,804,055 B2 * | 9/2010 | Backes | B60S 1/0822 250/227.25 |
| 7,894,054 B2 * | 2/2011 | Backes | G02B 27/0101 356/239.8 |
| 8,082,783 B2 * | 12/2011 | Backes | B60S 1/0837 73/170.17 |
| 8,269,202 B2 * | 9/2012 | Backes | B60S 1/0837 250/573 |
| 10,207,680 B2 * | 2/2019 | Backes | G02B 27/0927 |
| 2005/0199785 A1 | 9/2005 | Yamaguchi et al. | |
| 2007/0235638 A1 * | 10/2007 | Backes | B60S 1/0837 250/227.24 |
| 2008/0116379 A1 * | 5/2008 | Teder | B60S 1/0822 250/341.1 |
| 2008/0297803 A1 * | 12/2008 | Backes | B60S 1/0837 356/445 |
| 2009/0032689 A1 * | 2/2009 | Backes | B60S 1/0837 250/227.24 |
| 2009/0261237 A1 * | 10/2009 | Backes | B60S 1/0837 250/227.11 |
| 2009/0284735 A1 * | 11/2009 | Backers | G01J 1/4204 356/73 |
| 2010/0006140 A1 * | 1/2010 | Parker | F24S 23/30 136/246 |
| 2012/0267514 A1 * | 10/2012 | Backes | G02B 5/045 250/208.2 |
| 2013/0032704 A1 | 7/2013 | Fish, Jr. et al. | |
| 2015/0102212 A1 | 4/2015 | Ruh | |
| 2015/0192460 A1 | 7/2015 | Gohmann et al. | |
| 2017/0174182 A1 * | 6/2017 | Park | G01N 21/552 |
| 2017/0182978 A1 * | 6/2017 | Backes | B60S 1/0837 |
| 2018/0239064 A1 * | 8/2018 | Backes | G02B 3/08 |
| 2019/0124273 A1 * | 4/2019 | Liebetraut | H04N 5/2254 |
| 2019/0353591 A1 * | 11/2019 | Backes | G01N 21/552 |
| 2020/0001773 A1 * | 1/2020 | Backes | G02B 19/0076 |
| 2020/0249081 A1 * | 8/2020 | Backes | G01J 1/0407 |

FOREIGN PATENT DOCUMENTS

| | | |
|---|---|---|
| DE | 102004055060 A1 | 5/2006 |
| DE | 102007048612 A1 | 4/2009 |

\* cited by examiner

LENS PLATE, RAIN SENSOR, AND LIGHT SENSOR

RELATED APPLICATIONS

This application filed under 35 U.S.C § 371 is a national phase application of International Application Serial Number PCT/EP2018/076140 filed Sep. 26, 2018, which claims the benefit of German Application No. 10 2017 122 444.0 filed Sep. 27, 2017, the subject matter of which are incorporated herein by reference in their entirety.

TECHNICAL FIELD

The invention relates to a lens plate for a rain and/or light sensor and to a rain and/or light sensor.

BACKGROUND

Usually, in rain and light sensors, several optical components are combined in a common lens plate to ensure a cost-effective manufacture. Such a component is a lens, for example, which focuses incident light beams before the latter are sensed by a light sensor.

In rain and light sensors known from the prior art, lens plates comprising at least one Fresnel lens which focuses incident light towards the light sensor are usually used. In rain and light sensors, it is desired, if possible, that merely light incident from a specific direction reaches the light sensor. However, current Fresnel optics often include additional reception lobes such that light incident from a direction different from the desired direction can reach the light sensor. This may generally be referred to as parasitic light incidence.

SUMMARY

The object of the invention is to provide a lens plate for a rain and/or light sensor and a rain and/or light sensor having an improved directional pattern.

The object is achieved according to the invention by a lens plate for a rain and/or light sensor, having a base body, at least one light limitation structure, and at least one lens structure, the light limitation structure extending into the base body from a lower side of the lens plate, a contour of the light limitation structure facing away from the lower side of the lens plate limiting the lens structure circumferentially, and the contour being substantially triangular. Substantially triangular means here that the lens structure has three corner points. They are for example connected in pairs substantially by geodesic lines on a curved surface of the lens structure. The lens plate according to the invention has the advantage that owing to the light limitation structure, only light beams hitting the lens plate from a predefined region of the environment also reach the lens structure. The lens plate thus has an improved directional pattern. Furthermore, the lens plate is particularly compact as the lens structure is located within the base body of the lens plate. In other words, the lens structure is received in the base body.

Therefore, the contour of the light limitation structure which faces away from the lower side of the lens plate and limits the lens structure circumferentially does not extend on the lower side of the lens plate.

In other words, the light limitation structure extends from the lower side of the lens plate, for example perpendicularly up to the contour of the light limitation structure which limits the lens structure circumferentially.

The contour of the light limitation structure constitutes the end of the light limitation structure opposite the lower side of the lens plate.

Preferably, the light limitation structure and/or the lens structure is/are substantially formed by at least one recess in the lens plate, in particular the edge of the at least one recess. In other words, the lens structure and/or the light limitation structure limits/limit the at least one recess. The lens plate is therefore simple to manufacture, in particular by injection-moulding, and is particularly compact.

More preferably, the recess is without undercuts, a cross-sectional area of the recess decreasing in particular monotonically from the lower side of the lens plate towards an upper side of the lens plate opposite the lower side. The lens plate can thus simply be removed from the mould after the manufacture. A complex postprocessing is therefore no longer necessary. This is also described as being off-tool.

According to one aspect, the light limitation structure includes a first and a second light limitation structure surface, the first and the second light limitation structure surface enclosing together a predefined angle. The azimuth under which the incident light beams can still reach the lens structure is therefore limited to an angular range which is determined by the predefined angle. The azimuth is thus an angle which is defined in a plane which coincides with a surface of the upper side of the lens plate or which is parallel thereto.

A further aspect provides that the light limitation structure includes a third light limitation structure surface, the third light limitation structure surface having a predefined maximum height with respect to the lower side of the lens plate. The third light limitation structure surface limits the angle of incidence of light beams onto the lens plate surface with respect to the normal in a predefined manner to a maximum value. The directional pattern of the lens plate is thus even better adjustable.

The "height with respect to the lower side of the lens plate" is to be understood as the distance to the lower side of the plate, the third light limitation structure surface being located within the lens plate, i.e. between the lower side and the upper side of the lens plate.

Accordingly, the "predefined maximum height" means that a distance of the individual points on the third light limitation structure surface to the lower side of the lens plate does not exceed a predefined value.

According to a configuration of the invention, the lens structure forms a converging lens. This is particularly advantageous when the lens plate is used along with a light sensor as the lens plate can then focus incident light towards the light sensor.

A further configuration provides that the lower side of the lens plate is provided at least in sections with a light-absorbing material and is in particular coated with the light-absorbing material. It is therefore possible in a simple manner to limit the transmission of light beams through the lens plate to a predefined desired area. Since the lens structure is provided within the base body, it is particularly simple to apply the light-absorbing material onto the lower side.

Furthermore, the object is achieved according to the invention by a rain and/or light sensor having the lens plate described above and a light reception means. Concerning the advantages, reference is made to the above explanations.

The lens structure preferably forms a converging lens, the light reception means being arranged in a focal point of the lens structure. Light incident onto the lens plate is thus focused onto the light reception means, as a result of which the light efficiency is increased and the light sensitivity of the rain and/or light sensor is improved.

One aspect provides that the light limiting structure includes a first and a second light limitation structure surface, the first and the second light limitation structure surfaces enclosing together a predefined angle, the predefined angle being such that an azimuth of light beams hitting the light reception means through the lens plate is limited to a predefined range. The angular range in which the light beams hitting the lens plate reach the light reception means can thus be limited in the desired manner. The visual field of the light reception means can thus be simply adapted by selecting the predefined angle.

According to a further aspect, it is provided that the light limitation structure includes a third light limitation structure surface, the third light limitation structure surface having a predefined maximum height with respect to the lower side of the lens plate, the third light limitation structure surface limiting the angle of incidence of light beams hitting the light reception means through the lens plate to a maximum angle with respect to the lens plate. The angle is measured with respect to the normal to the lens plate surface. Owing to the selection of the predefined maximum height, the visual field of the light reception means can be adapted in a simple manner.

The third light limitation structure surface and the lens structure are in particular configured and the predefined maximum height is selected such that light beams hitting the lens plate at an angle of incidence which is greater than the maximum angle cannot reach the light reception means. In the opposite direction, i.e. from the light reception means through the lens plate, such light beams would be totally reflected at the transition from the lens plate to the environment. According to the principle of reversibility of light paths, such light beams thus have no valid path from the environment to the light reception means.

DESCRIPTION OF THE DRAWINGS

Further advantages and properties of the invention result from the description below and from the drawings to which reference is made. The drawings show.

DETAILED DESCRIPTION

Figure 1:
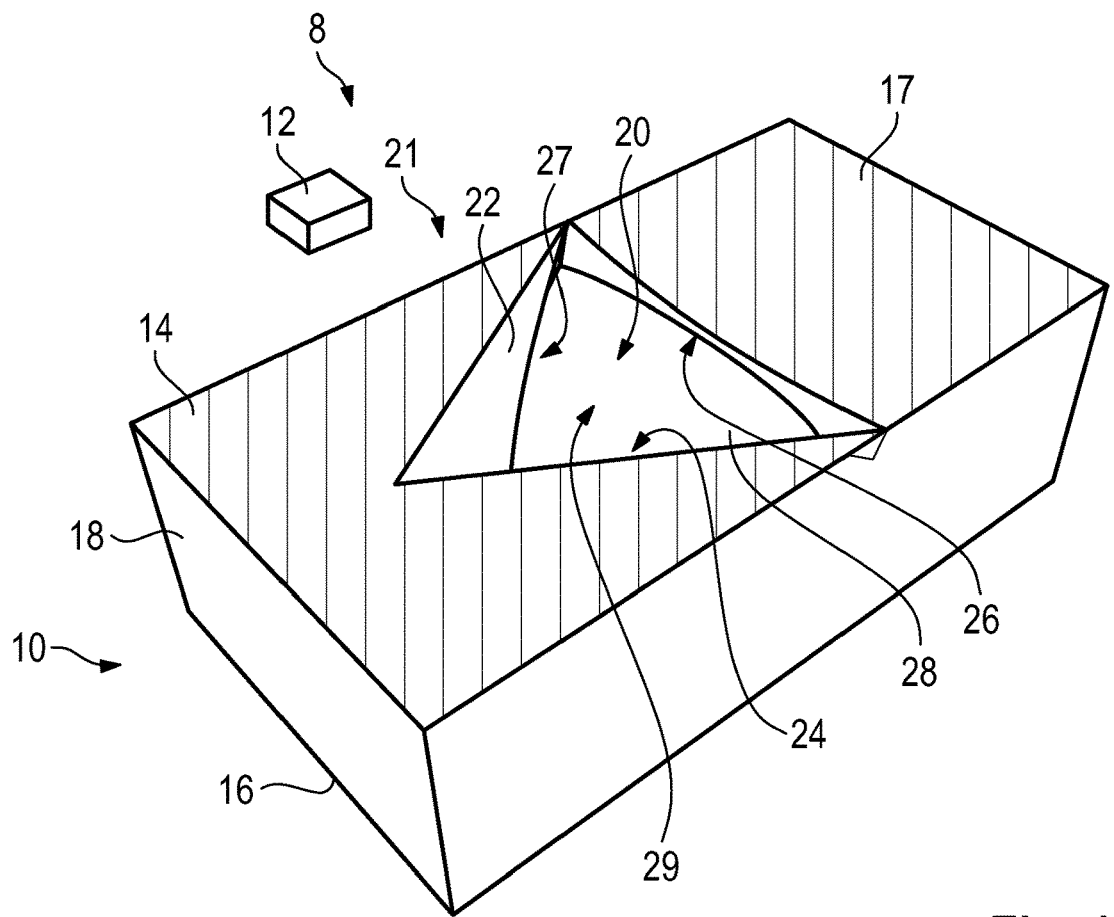
FIG. 1 a portion of a rain and/or light sensor according to the invention with a view onto the lower side.
Figure 2:
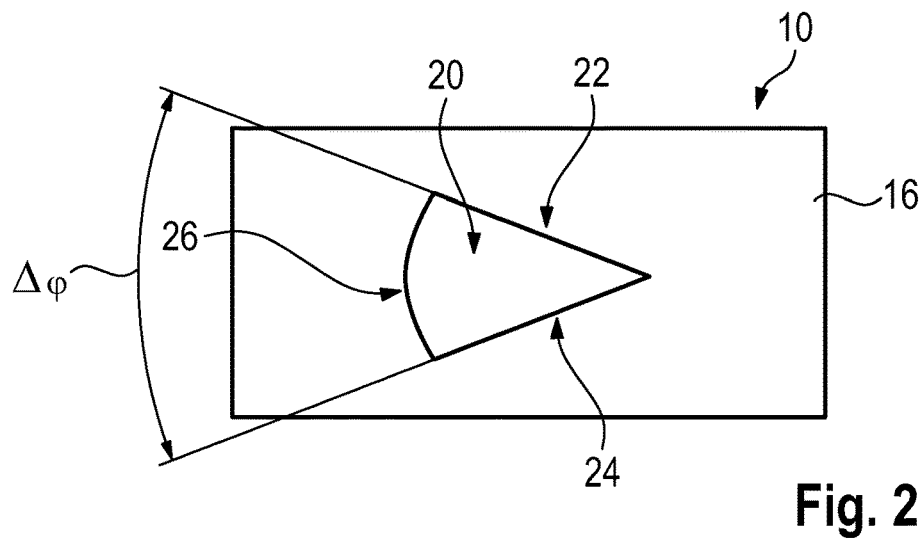
FIG. 2 a schematic section through a surface of the rain and/or light sensor according to the invention of FIG. 1.

FIGS. 1 and 2 show a portion of a rain and/or light sensor 8 comprising a lens plate 10 and at least one light reception means 12 spaced apart from the lens plate 10.

The lens plate 10 includes a lower side 14 having a substantially plane surface and an upper side 18 opposite the lower side 14 which also has a substantially plane surface.

In the variant shown, the lower side 14 is coated with a light-absorbing material 17.

A recess 20 the edge faces of which form a light limitation structure 21 having a first, a second and a third light limitation structure surface 22, 24, 26 is formed in a base body 18 of the lens plate 10. The light limitation structure surfaces 22, 24, 26 extend from the lower side 14 towards the upper side 16 into the base body 18.

A contour 27 of the light limitation structure surfaces 22, 24, 26 facing away from the lower side 14 of the lens plate 10 limits a lens structure 28 circumferentially. In other terms, the lens structure 28 is substantially formed by the recess 20 in the base body 18 of the lens plate 10.

Furthermore, the recess 20 is without undercuts such that the lens plate 10 is off-tool. The lens plate 10 can thus be removed from the mould and is therefore simple to manufacture, by injection-moulding, for example. The lens plate 10 can hence be formed from a plastic material the index of refraction of which differs from the index of refraction of air.

The recess 20 may have a cross-sectional area which decreases monotonically, in particular strictly monotonically from the lower side 14 towards the upper side 16.

In the embodiment shown, the lens structure 28 forms a converging lens 29. The surface of the converging lens 29 is convex, i.e. is curved outwardly as viewed from the upper side 16 of the lens plate 10 towards the lower side 14.

The lens structure 28 has a substantially triangular contour 27 as is clearly apparent from FIG. 1. Triangular means here that the lens structure 28 includes three corner points which are connected in pairs substantially by geodesic lines on the convex surface of the lens structure 28 forming the converging lens 29. Two respective corner points of the triangular contour 27 are therefore connected to each other.

Figure 3:
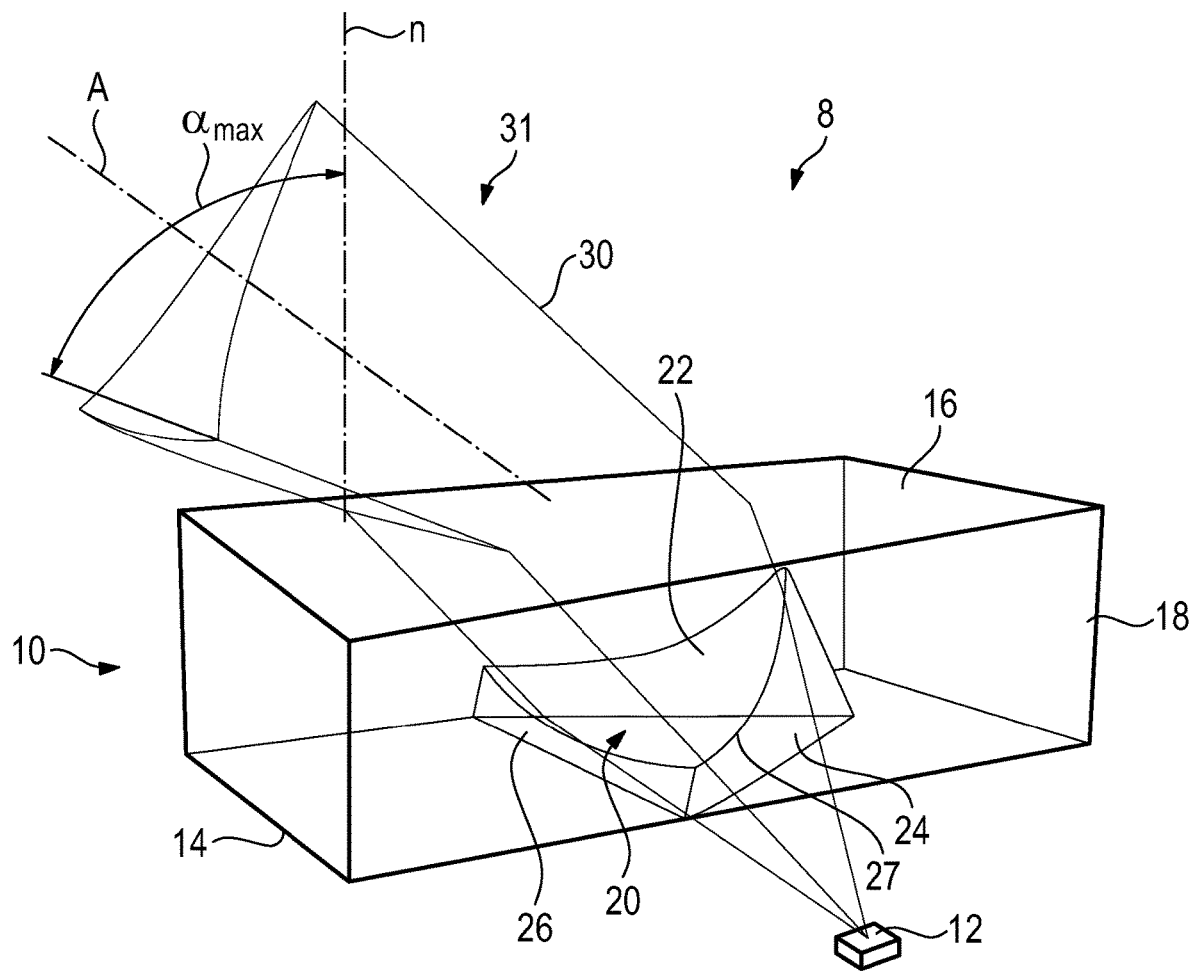
FIG. 3 the rain and/or light sensor according to the invention of FIG. 1 with a view onto the surface and in a view turned through 180°.

The light reception means 12 is arranged in the focal point of the lens structure 28 such that light beams 30 lying in the visual field 31 of the light reception means 12 are focused towards the light reception means 12, as shown in FIG. 3.

The visual field 31 of the light reception means 12 is substantially determined by the light limitation structure 21 as will be explained in detail below.

The arrangement composed of the lens plate 10 and the light reception means 12 has a main receiving direction A (see FIG. 3) which encloses together with the plane which coincides with the upper side 16 an angle different from 90°. The main receiving direction A is therefore inclined with respect to the upper side 16.

FIG. 2 shows that the first and the second light limitation structure surfaces 22, 24 together enclose a predefined angle $\Delta\phi$ and therefore limit the azimuth $\phi$ of the incident light beams 30 which can reach the light reception means 12 to an angular range $\Delta\phi$. The azimuth $\phi$ is here an angle which is defined in a plane which coincides with the surface of the upper side 16 or which is at least parallel thereto.

The first and the second light limitation structure surfaces 22, 24 are configured such that the outer light beams 30 which are intended to just reach the light reception means 12 just contact the first or second light limitation structure surface 22, 24.

The light limitation structure surfaces 22, 24, 26 extend between the contour 27 and the lower side 14 in a substantially plane manner. The corresponding light limitation structure surfaces 22, 24, 26 may therefore also be referred to a smooth.

A contour of the light limitation structure surfaces 22, 24, 26 on the lower side 14, i.e. in the plane of the lower side 14, limits a base of the recess 20 which is also substantially triangular.

Light beams 30 having an azimuth outside the angular range $\Delta\phi$ cannot reach the light reception means 12 as they travel through the base body 18 of the lens plate 10 outside the recess 20 and hit the light absorbing layer 17 on the lower side 14.

The third light limitation structure surface 26 is configured so as to define a maximum angle $\alpha_{max}$ (see FIG. 3) at which light beams 30 hitting the upper side 16 can still reach the light reception means 12. The angle $\alpha_{max}$ is measured with respect to the normal n to the surface of the upper side 16.

The points on the contour of the third light limitation structure surface 26 have a minimum height with respect to the lower side 14 of the lens plate 10. The height is selected such that light beams hitting the upper side 16 at an angle of more than $\alpha_{max}$ have no valid light path towards the light reception means 12. In the opposite direction, i.e. from the light reception means 12 through the lens plate 10, such light beams would be totally reflected at the transition from the lens plate 10 to the environment, i.e. on the upper side 16. According to the principle of reversibility of light paths, such light beams thus have no valid path from the environment towards the light reception means 12.

In summary, a desired visual field 31 of the light reception means 12 is therefore obtained by an appropriate design of the light limitation structure surfaces 22, 24, 26.

The corresponding visual field 31 is in particular apparent from FIG. 3 and has a substantially triangular face which results from the contour 27 of the light limitation structure 21.

The invention claimed is:

1. A lens plate (10) for a rain and/or light sensor (8), having a base body (18), at least one light limitation structure (21), and at least one lens structure (28), the light limitation structure (21) extending into the base body (18) from a lower side (14) of the lens plate (10), a contour (27) of the light limitation structure (21) facing away from the lower side (14) of the lens plate (10) limiting the lens structure (28) circumferentially, and the contour (27) being substantially triangular.

2. The lens plate (10) according to claim 1, wherein the light limitation structure (21) and/or the lens structure (28) is/are substantially formed by a recess (20) in the lens plate (10).

3. The lens plate (10) according to claim 2, wherein the recess (20) is without undercuts, in particular a cross-sectional area of the recess (20) decreasing monotonically from the lower side (14) of the lens plate (10) towards an upper side (16) of the lens plate (10) opposite the lower side (14).

4. The lens plate (10) according to claim 1, wherein the light limitation structure (21) includes a first and a second light limitation structure surface (22, 24), the first and the second light limitation structure surfaces (22, 24) enclosing together a predefined angle ($\Delta\varphi$).

5. The lens plate (10) according to claim 1, wherein the light limitation structure (21) includes a third light limitation structure surface (26), the third light limitation structure surface (26) having a predefined maximum height with respect to the lower side (14) of the lens plate (10).

6. The lens plate (10) according to claim 1, wherein the lens structure (28) forms a converging lens (29).

7. The lens plate (10) according to claim 1, wherein the lower side (14) of the lens plate (10) is provided at least in sections with a light-absorbing material (17) and is in particular coated with the light-absorbing material (17).

8. A rain and/or light sensor (8) having a lens plate (10) according to claim 1 and a light reception means (12).

9. The rain and/or light sensor (8) according to claim 8, wherein the lens structure (28) forms a converging lens (29), the light reception means (12) being arranged in a focal point of the lens structure (28).

10. The rain and/or light sensor (8) according to claim 8, wherein the light limitation structure (21) includes a first and a second light limitation structure surface (22, 24), the first and the second light limitation structure surface (22, 24) enclosing together a predefined angle ($\Delta\varphi$), the predefined angle ($\Delta\varphi$) being such that an azimuth of light beams (30) hitting the light reception means (12) through the lens plate (10) is restricted to a predefined range.

11. The rain and/or light sensor (8) according to claim 8, wherein the light limitation structure (21) comprises a third light limitation structure surface (26), the third light limitation structure surface (26) having a predefined maximum height with respect to the lower side (14) of the lens plate (10), the third light limitation structure surface (26) limiting the angle of incidence of light beams (30) hitting the light reception means (12) through the lens plate (10) to a maximum angle ($\alpha_{max}$) with respect to the lens plate (10).

12. A lens plate (10) for a rain and/or light sensor (8), having a base body (18), at least one light limitation structure (21), and at least one lens structure (28), the light limitation structure (21) extending into the base body (18) from a lower side (14) of the lens plate (10), a contour (27) of the light limitation structure (21) facing away from the lower side (14) of the lens plate (10) limiting the lens structure (28) circumferentially, and the contour (27) being substantially triangular, wherein the light limitation structure (21) and the lens structure (28) is/are substantially formed by a recess (20) in the lens plate (10).

* * * * *